United States Patent
Frasier

[19]

[11] Patent Number: 6,076,613
[45] Date of Patent: Jun. 20, 2000

[54] FORWARDLY-FOLDING AGRICULTURAL IMPLEMENT

[75] Inventor: Michael E. Frasier, Lexington, Nebr.

[73] Assignee: Orthman Manufacturing, Inc., Lexington, Nebr.

[21] Appl. No.: 09/149,692

[22] Filed: Sep. 8, 1998

[51] Int. Cl.[7] .................................................. A01B 49/00
[52] U.S. Cl. ...................... 172/311; 172/481; 172/605; 172/626; 172/456; 172/776; 111/57
[58] Field of Search ..................... 172/311, 456, 172/457, 470, 481, 669, 776, 401, 413, 418, 423, 507, 626, 605, 581; 111/57, 53

[56] References Cited

U.S. PATENT DOCUMENTS

| | | |
|---|---|---|
| 4,137,852 | 2/1979 | Pratt . |
| 4,172,537 | 10/1979 | Gandrud et al. . |
| 4,319,643 | 3/1982 | Carter et al. . |
| 4,504,076 | 3/1985 | Bedney . |
| 4,518,046 | 5/1985 | Rettig et al. . |
| 4,582,143 | 4/1986 | Pratt . |
| 4,596,290 | 6/1986 | Bedney . |
| 4,723,787 | 2/1988 | Hadley et al. . |
| 5,062,489 | 11/1991 | Adee ........................................ 172/311 |
| 5,088,563 | 2/1992 | Shidler .................................... 172/456 |
| 5,113,956 | 5/1992 | Friesen et al. . |
| 5,228,522 | 7/1993 | Stufflebeam ............................ 172/413 |
| 5,232,054 | 8/1993 | Van Blaricon et al. ................. 172/311 |
| 5,291,954 | 3/1994 | Kirwan . |
| 5,488,996 | 2/1996 | Barry et al. ............................. 172/311 |
| 5,647,440 | 7/1997 | Barry et al. . |
| 5,787,988 | 8/1998 | Harlan et al. ........................... 172/311 |
| 5,829,535 | 11/1998 | Line ........................................ 172/401 |
| 5,839,516 | 11/1998 | Arnold et al. .......................... 172/456 |

*Primary Examiner*—Victor Batson
*Attorney, Agent, or Firm*—Zarley, McKee, Thomte, Voorhees & Sease

[57] ABSTRACT

A forwardly-foldable agricultural implement includes a center frame supported by wheels and extending generally transverse to the direction of travel, and a pair of wing sections. Each wing section has an intermediate portion pivotally connected to the center frame by a foldable frame and being supported by a wheel. The foldable frame includes a pair of elongated wing support members having one end connected to the center frame and another end connected to the respective wing section. The foldable frame also includes a pair of hitch arms with one end connected to a two-direction pivot knuckle on a three-point tractor hitch and another end pivotally connected to the respective wing section and its wing support member. This structure provides a method of changing a foldable implement between a wide, field operating configuration and a narrower, road transport configuration without the necessity of a telescopic tongue member.

25 Claims, 9 Drawing Sheets

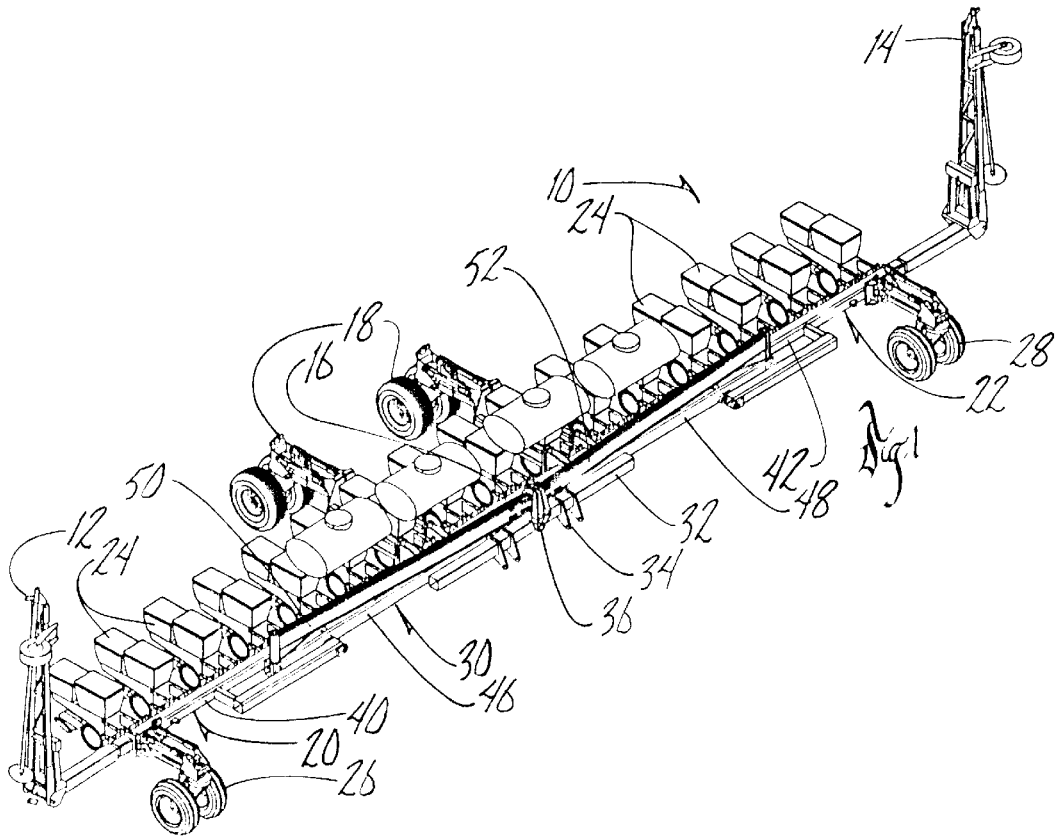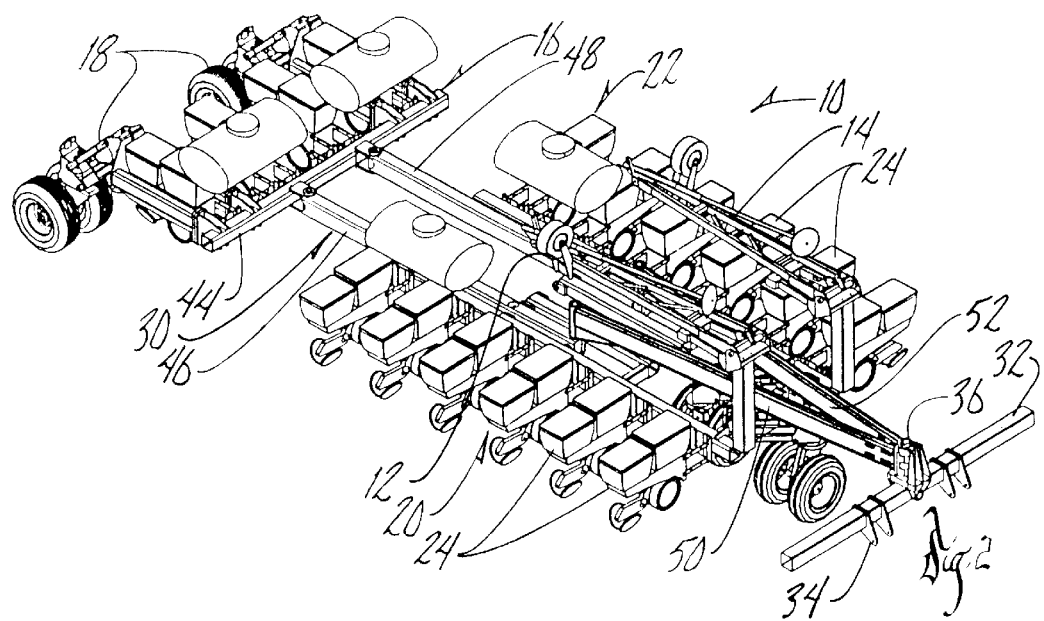

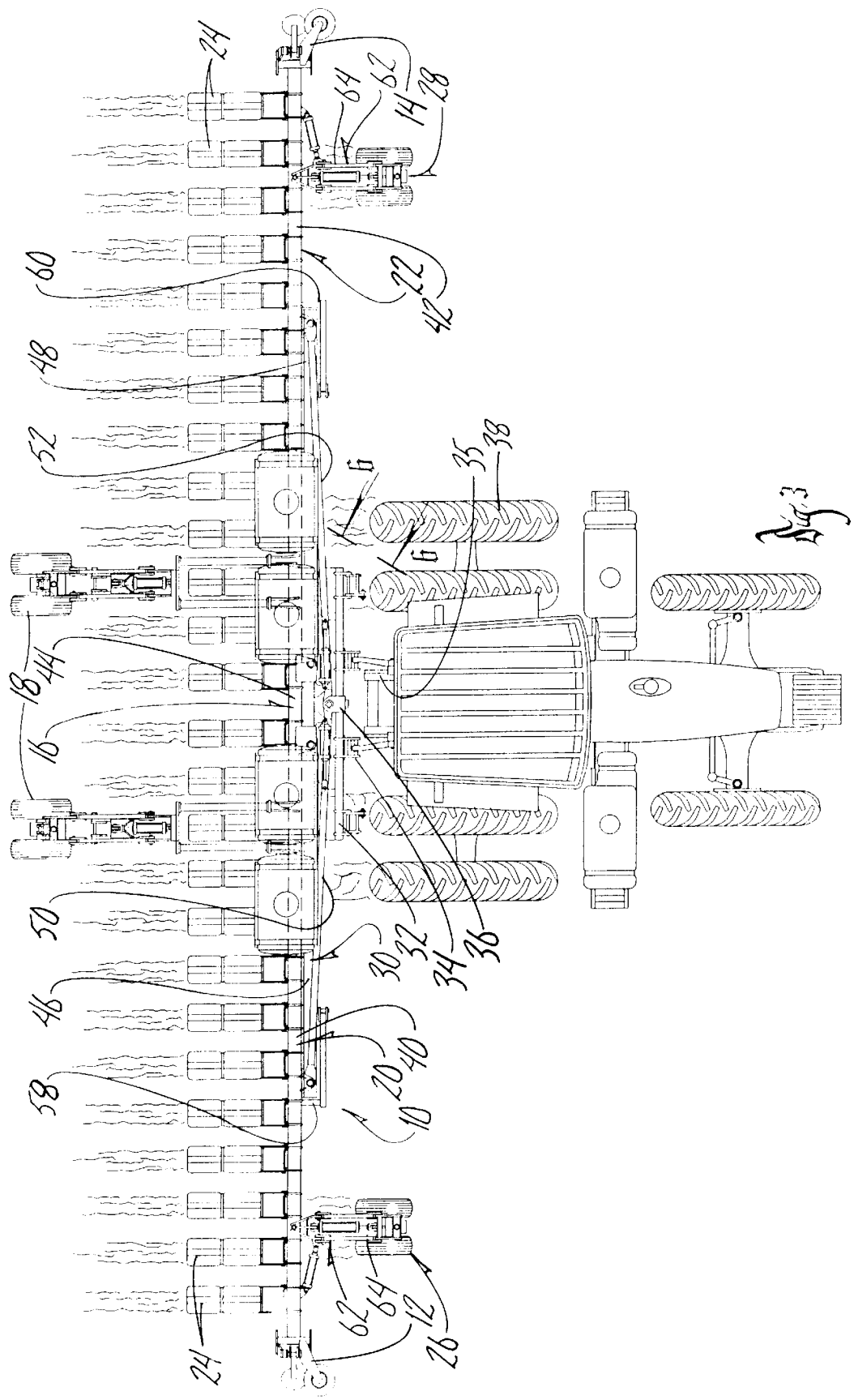

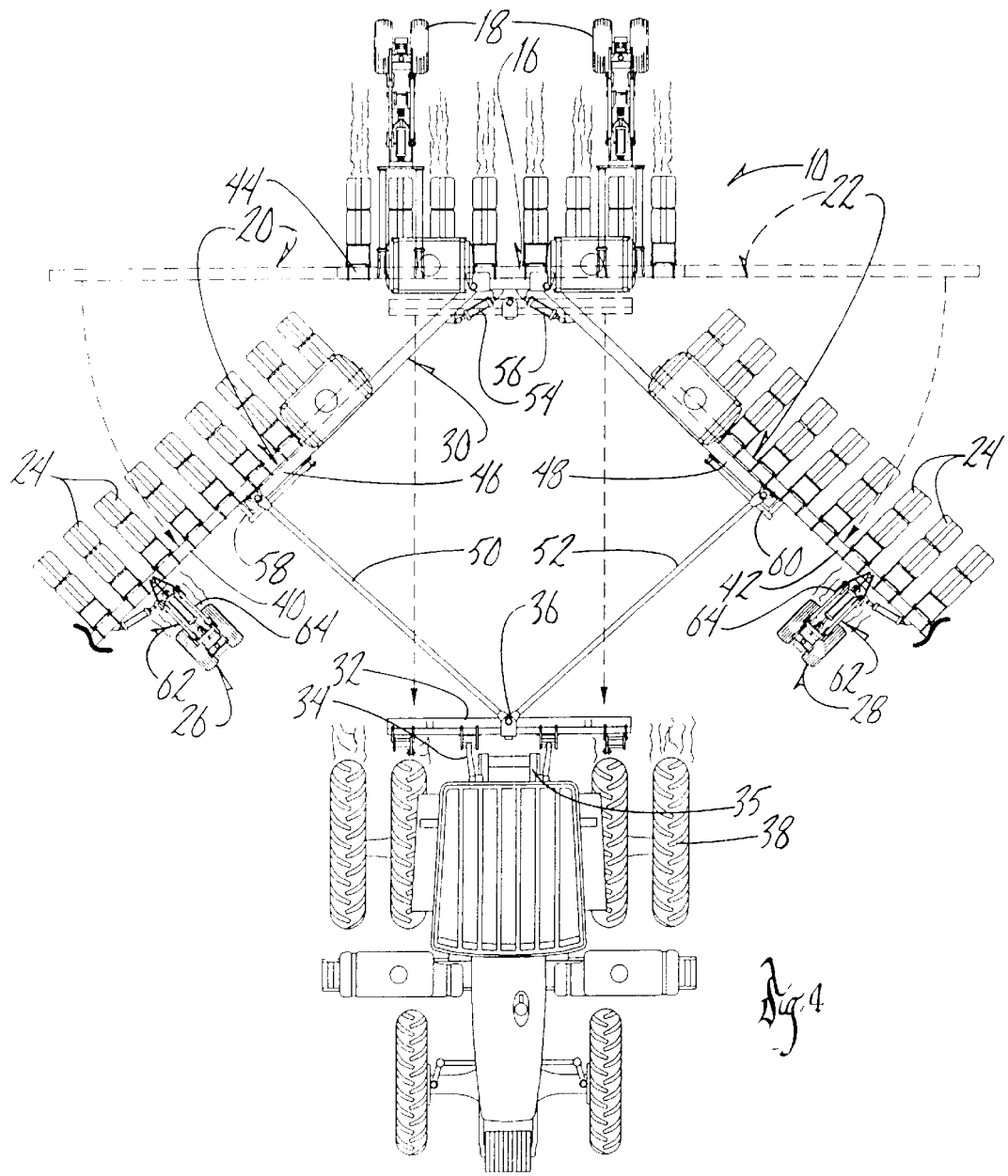

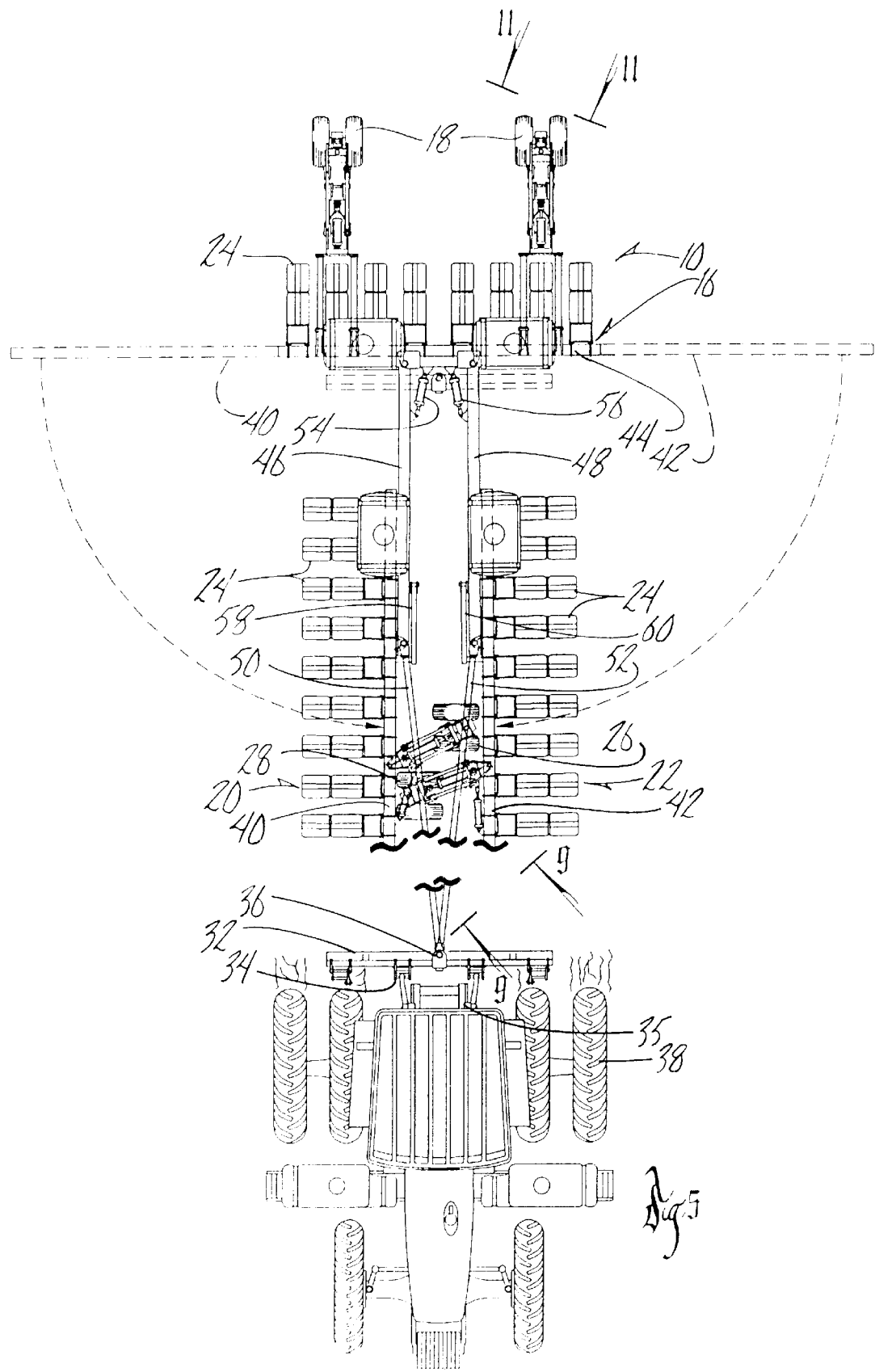

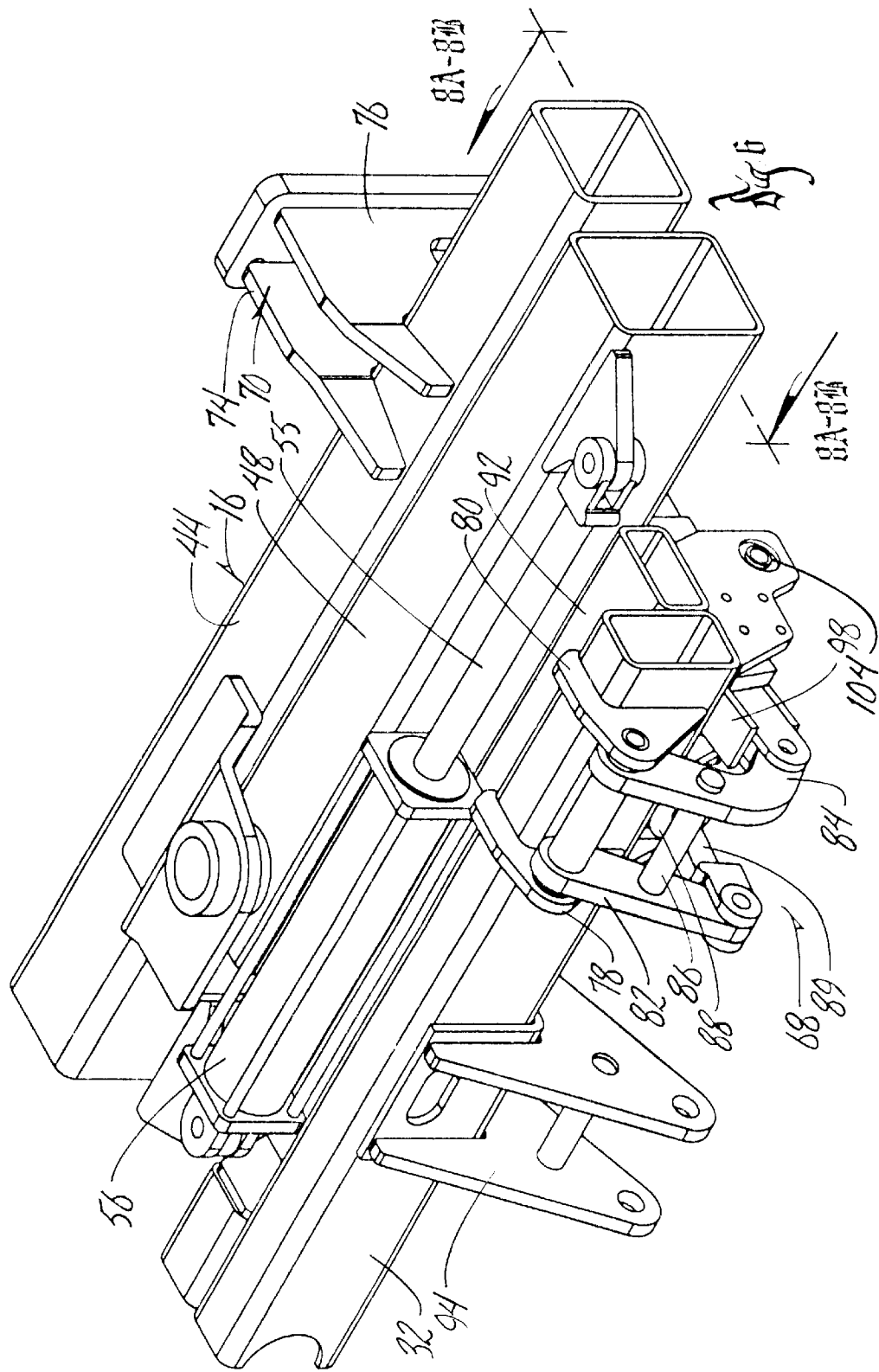

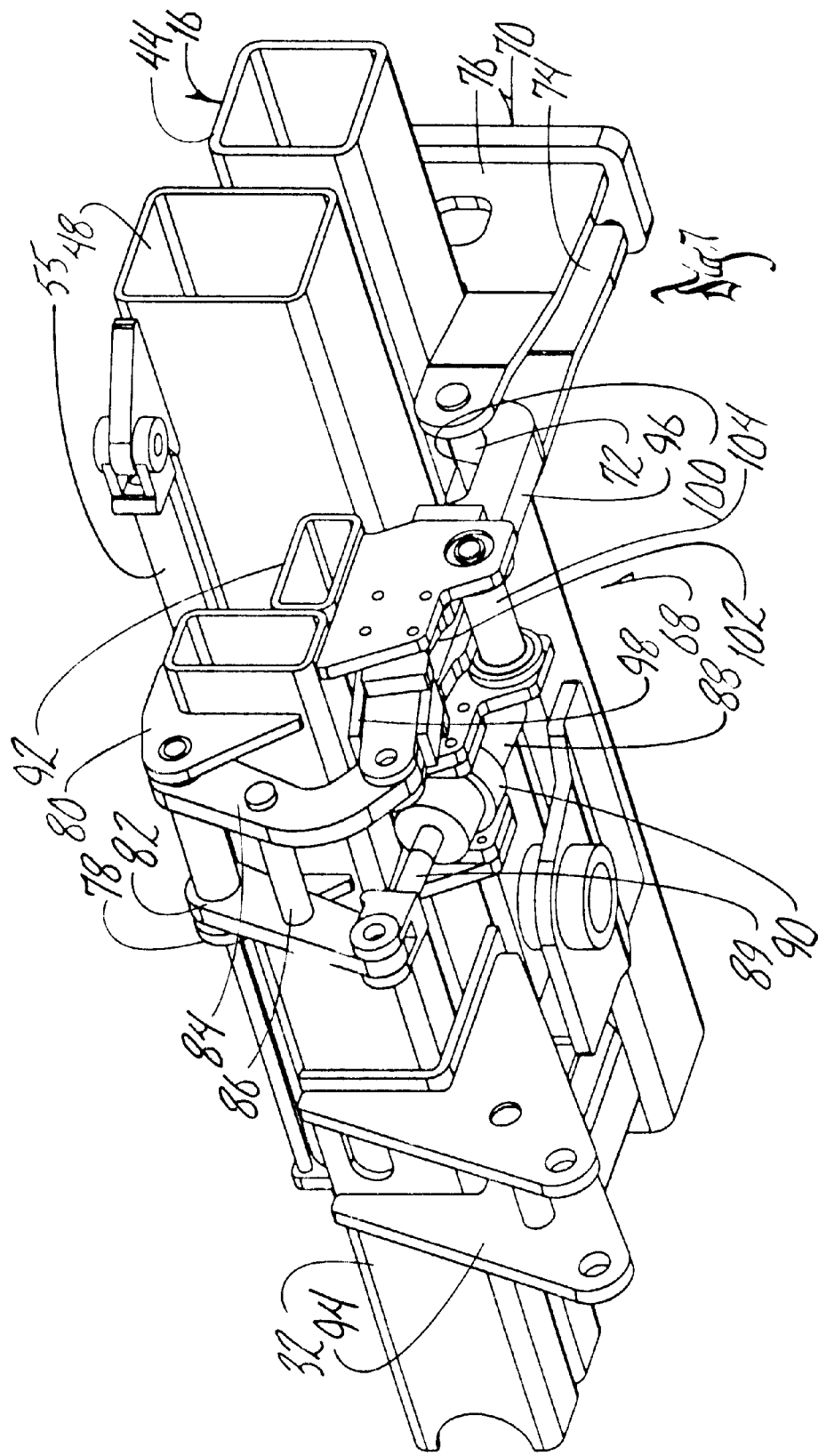

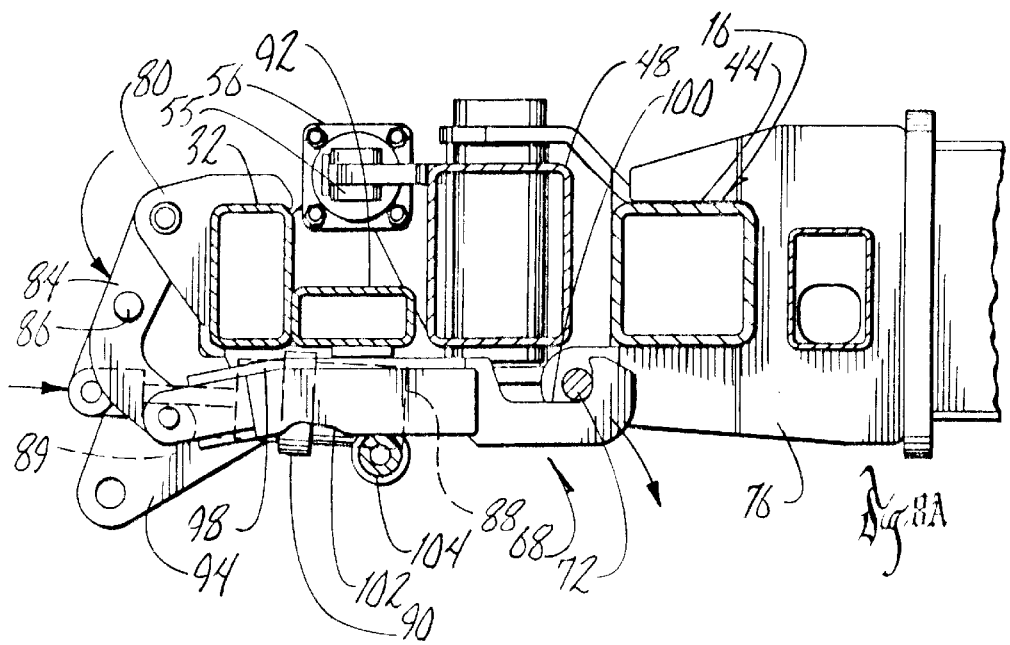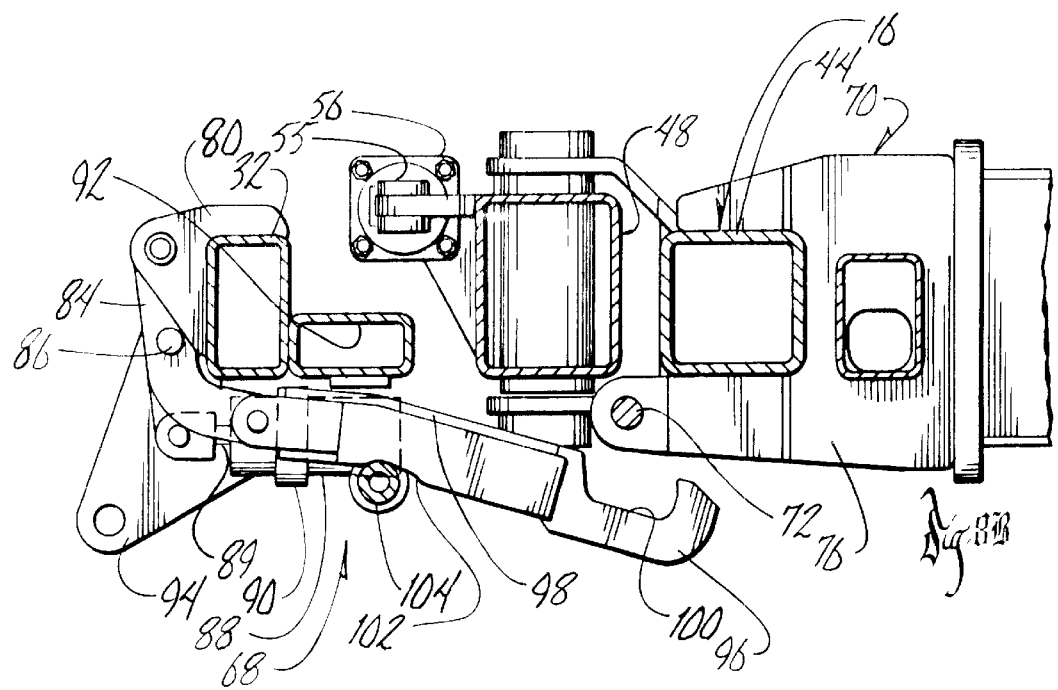

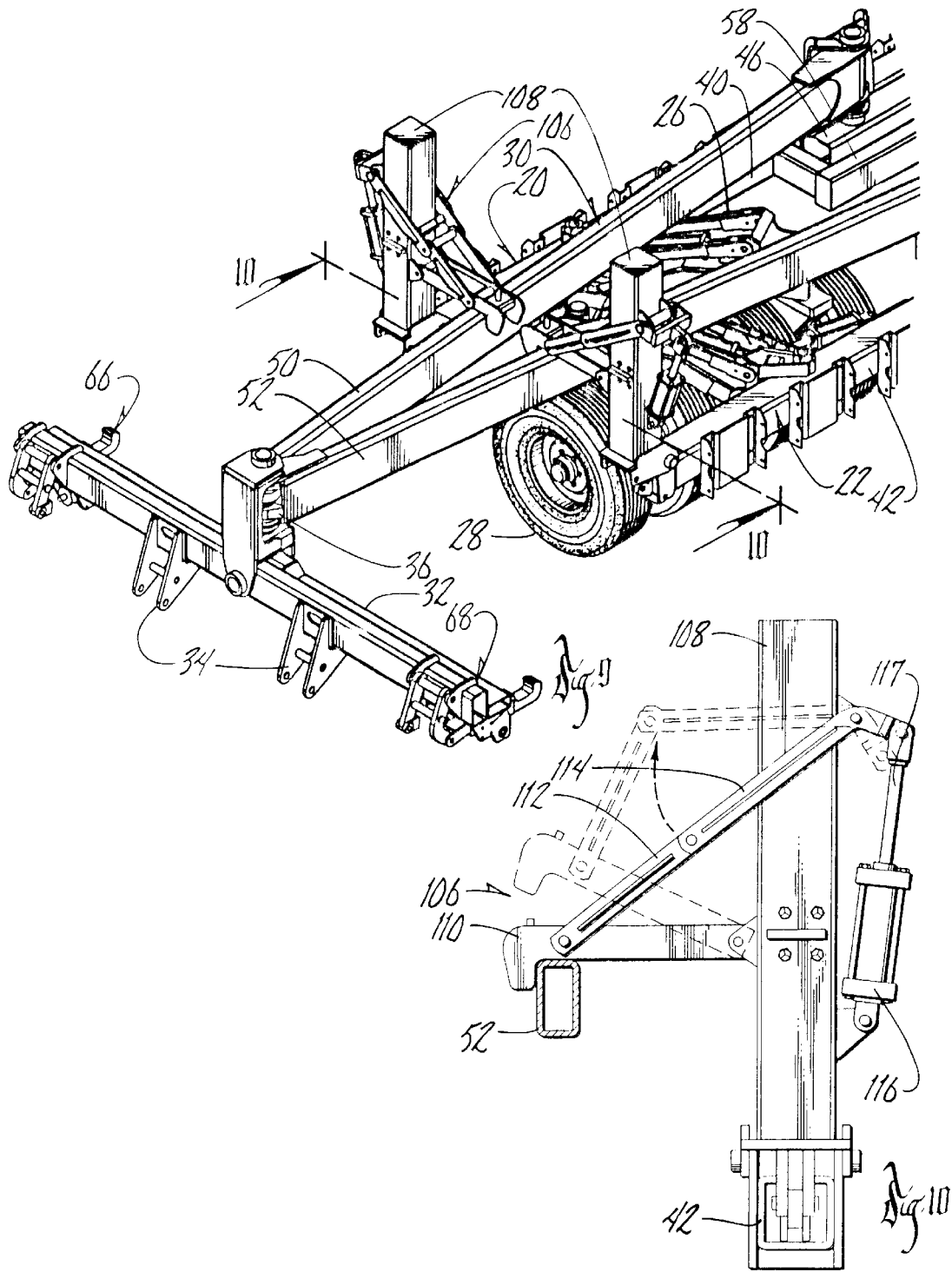

FORWARDLY-FOLDING AGRICULTURAL IMPLEMENT

BACKGROUND OF THE INVENTION

The present invention relates to tractor-drawn agricultural equipment. More particularly, this invention relates to an implement that converts between a wide, field traversing configuration to a narrower, road transport configuration by folding and unfolding. The foldable feature is useful on many types of implements, including but not limited to planters.

Various forwardly-folding agricultural implements or tool carriers are known and are aimed at meeting the dual and conflicting needs of being wide enough to work many rows in the field and narrow enough to be transported over roads. One such device is disclosed in U.S. Pat. No. 4,582,143 which issued to Pratt in 1986. The device has a central rear or trailing section supported by wheels. No ground working tools are carried by the central section. Left and right wing sections carrying tools are pivotally mounted to a telescopic tongue that also is connected to the rear section and the drawbar of the tractor. The telescopic tongue must extend as the wing sections are folded forwardly and inwardly for the transport mode. As a result, the overall length of the implement increases undesirably. The rear section then moves forwardly to counteract this tendency. Unfortunately, the telescopic tongue requires considerable precision to make and is subject to high maintenance requirements to ensure smooth, reliable action. The static and dynamic loads on the telescopic tongue can make its strength a significant design concern.

Therefore, a primary objective of the present invention is the provision of a wide-framed implement which can be closely coupled to the tractor in field operation for maneuverability and weight transfer, yet is foldable into a transport configuration which has a low center of gravity and narrow transport width.

Another objective of the present invention is the provision of a forwardly-folding agricultural implement or tool carrier which is an improvement over the existing forwardly-folding agricultural implements, especially those equipped with a telescopic tongue.

Another objective of this invention is the provision of a folding agricultural implement which does not rely on a telescoping tongue member.

Another objective of this invention is the provision of a folding agricultural implement which is compact in length and width in the transport position.

Another objective of this invention is the provision of a folding agricultural implement which can work a large number of rows in the field position.

Another objective of this invention is the provision of a folding agricultural implement which has front-mounted wing section wheels and allows the wing sections to be folded relatively tightly together in the transport position.

Another objective of this invention is the provision of a folding agricultural implement which is adaptable to being drawn by a three-point hitch so as to achieve a smaller turning radius and greater maneuverability.

Another objective of this invention is the provision of a folding agricultural implement which has lifting gage wheels that move with respect to the wing support in order to make room for the other lifting gage wheel in the transport position.

Another objective of this invention is the provision of a folding agricultural implement which can be raised and lowered in a level manner in both the transport and field positions.

Another objective of this invention is the provision of an agricultural implement having caster wheels which are hydraulically raisable and pivot about a vertical axis.

Another objective of this invention is the provision of an agricultural implement wherein some of the wheels are lockable in a desired pivot position, such as parallel to the direction of travel.

Another objective of this invention is the provision of an agricultural implement having hydraulically operated latches for securing the wing sections in either the field or transport position.

Another objective of this invention is the provision of a method of folding the wing sections of an agricultural implement with respect to a center frame and latching them in field and transport positions.

These and other objectives will be apparent to one skilled in the art from the drawings, as well as the description and claims which follow.

SUMMARY OF THE INVENTION

The present invention relates to a forwardly-foldable agricultural implement which includes a center frame supported by wheels and extending generally transverse to the direction of travel and a pair of wing sections, each having an intermediate portion pivotally connected to the center frame by a foldable frame and being supported by a wheel. The foldable frame includes a pair of elongated wing support members having one end connected to the center frame and another end connected to the respective wing section. The foldable frame also includes a pair of hitch arms with one end connected to a two-direction pivot knuckle on a three-point tractor hitch and another end pivotally connected to the respective wing section and wing support member.

This structure provides a quick and easy method of changing a foldable implement between a wide, field operating configuration and a narrower, road transport configuration without the necessity of a telescopic tongue member.

BRIEF DESCRIPTION OF THE DRAWINGS

FIG. 1 is a perspective view of the implement or tool carrier of the present invention in a field position, mode, or configuration, with the marker wings raised.

FIG. 2 is a perspective view of this invention in a road transport position, mode, or configuration.

FIG. 3 is a top plan view of the implement of this invention in the field operating position while being drawn by a tractor.

FIG. 4 is a top plan view of the implement of this invention drawn by a tractor and wherein the wing sections of the implement have been moved or partially folded from the field position toward the transport position. The raised marker wings (see FIG. 2) have been omitted from this view.

FIG. 5 is a top plan view of the implement of this invention drawn by a tractor and wherein the wing sections of the implement have been moved fully into the transport position and latched. The raised marker wings (see FIG. 2) have been omitted from this view.

FIG. 6 is a perspective view, taken along line 6—6 in FIG. 3, and shows the top of the field position latching mechanism.

FIG. 7 is a perspective view of the bottom of the field position latching mechanism.

FIG. 8A is a cross-sectional view, taken along line 8A—8A in FIG. 6, of the field position latching mechanism in a latched condition.

FIG. 8B is a cross-sectional view similar to FIG. 8A, taken along line 8B—8B in FIG. 6, of the field position latching mechanism, but shows the field position latching mechanism in an unlatched condition.

FIG. 9 is a perspective view of the front portion of the folded implement taken along line 9—9 in FIG. 5 and shows the transport position latching mechanisms.

FIG. 10 is a side view, taken along line 10—10 in FIG. 9, of the transport position latching mechanism. The latched position is shown in solid lines, and the unlatched position is shown in dashed lines.

DETAILED DESCRIPTION OF THE PREFERRED EMBODIMENT

Figure 11:
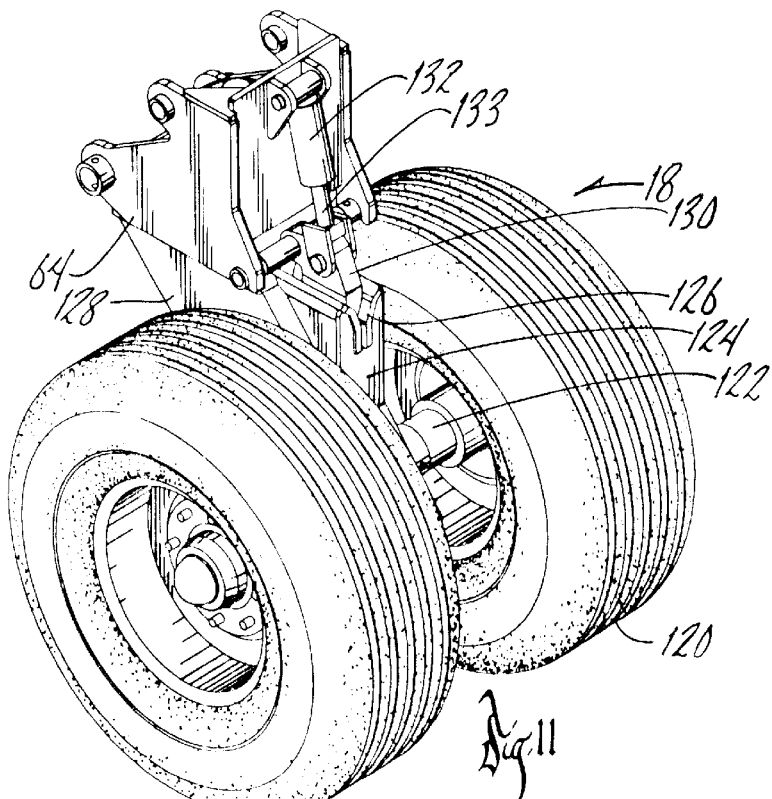
FIG. 11 is a perspective view of the rear castering lift assist wheel assembly, taken along 11—11 in FIG. 5, and shows the caster locking mechanism in the locked position, which prevents the caster wheels from pivoting about a vertical axis.

In the figures, the forwardly foldable agricultural implement or tool carrier of this invention is generally designated by the reference numeral 10. FIG. 1 illustrates the implement 10 in its field operating position, except the marker wings 12, 14 have been pivoted up into storage positions. FIG. 2 shows the road transport position of the implement 10 and more clearly reveals its basic components. The implement 10 includes a center frame 16 which is rollingly supported by a plurality of lift assist wheels 18. Referring to both FIGS. 1 and 2, a pair of wing sections 20, 22 extend from either side of the center frame 16. Various conventional ground working tools are mounted on the wing sections 20, 22, as well as on the center frame 16. In the figures, tools 24 comprise planting equipment, and the invention is particularly well suited for the planting function. However, the use of other types of tools is contemplated and will not detract from the invention. The remote ends of the wing sections 20, 22 are rollingly supported by at least one wing section wheel or lifting gage wheel 26, 28, respectively.

A foldable frame 30 interconnects the center frame 16 and the wing sections 20, 22. The foldable frame 30 is pivotally connected in two perpendicular directions to the tractor draft link 32 of a three-point hitch 34 by a knuckle mechanism 36. The three-point hitch 34 allows turning 60° each direction and 40° total roll. This structure allows the implement 10 to be drawn by a conventional tractor 38 (see FIGS. 3 and 4). Other tractor-like vehicles equipped with the appropriate hydraulics and a three-point hitch 34 can be used to tow the implement 10 without detracting from the invention.

Figure 12:
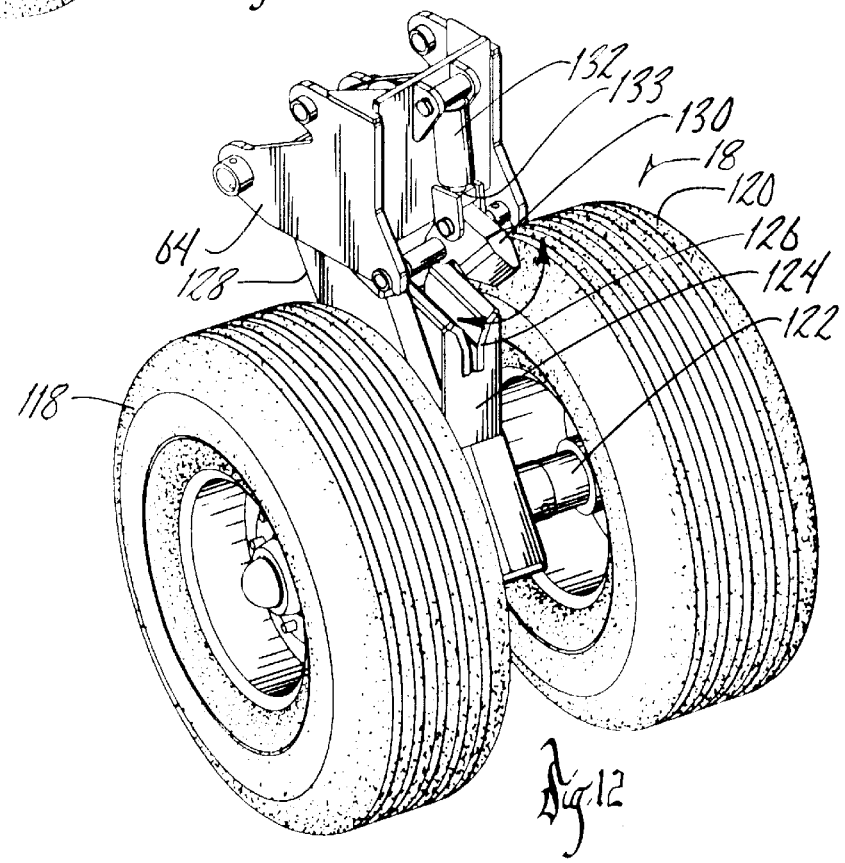
FIG. 12 is a perspective view similar to FIG. 11, but shows the caster locking mechanism in an unlocked condition that allows the caster wheels to pivot.

The wheels 18, 26, 28 have hydraulic means associated with them so as to raise, lower and thereby level the sections 16, 20, 22 of the implement 10 on which they are mounted. As best seen in FIGS. 11 and 12, the wheels are of the pivotal caster style. Except as described below, the caster wheels 18, 26, 28 are conventional. However, because the implement 10 utilizes hydraulics and substantially similar casters for wheels 18, 26, and 28, the wing section wheels 26, 28 can be slaved to the wheels 18 on the center frame 16 so that the implement 10 can be conveniently leveled in a coordinated fashion. Referring to FIG. 4, the wing sections 20, 22 each include an elongated tool bar 40, 42, respectively. The tools 24 mount to the tool bars 40, 42. A similar tool bar 44 is also provided on the center frame 16.

The wing sections have proximate ends, remote ends, and an intermediate portion. The intermediate portion is pivotally connected to the center frame 16 and the three-point hitch 34 by the foldable frame 30. The foldable frame 30 includes a pair of elongated wing support members 46, 48 for the wing sections 20, 22, respectively. Each of the support members 46, 48 has one end pivotally connected to the tool bar 44 of the center frame 16 and another end pivotally connected to the respective tool bar 40, 42 of the wing sections 20, 22 along a horizontal pivot axis with the tool bar 40, 42. The same remote end of the support member 46, 48 is also pivotally connected along a vertical pivot axis to a hitch arm 50, 52, respectively. The other ends of the hitch arms 50, 52 are pivotally joined together along a vertical axis at a two-direction knuckle mechanism 36 attached to the tractor draft link 32. As best seen in FIGS. 1, 3, 4, 5, and 9, each tool bar 40, 42 has an L-shaped pivot bracket 58,60 attached thereto. The bracket 58, 60 has a short leg rigidly attached to the respective tool bar 42, 44 and a long leg pivotally attached to the respective wing support member 46, 58. Respective fold cylinders 54, 56 mount on the tool bar 44 of the center frame 16 as shown and operatively engage the wing support members 46, 48 respectively. The cylinders 54, 56, and the movement of the tractor 38 if necessary, provide the folding action necessary to convert the implement 10 from the field operating position shown in FIG. 3 to the road transport position shown in FIG. 5.

As best seen in FIGS. 3–5, the wing section wheels 26, 28 are supported on a wheel carriage assembly 62 which is pivotally mounted to the respective tool bar 42, 44 of the wing section 20, 22 near its remote end. The wheel carriage assembly 62 includes a wheel mounting arm 64 which has one end mounted on the tool bar 40, 42 of the wing section 20, 22 and a free end rotatably supporting the wheel 26, 28. At least one of the ends of the wheel mounting arm is selectively movable longitudinally along the wing section 20, 22. In the preferred embodiment, the connection between the wheel mounting arm and the wing section is pivotal. However, it is contemplated that the mounting arm can be slidably mounted on a horizontal bar which extends longitudinally along the wing section without detracting from the present invention. In the preferred pivoting embodiment, a hydraulic cylinder 66 is operatively interposed between the respective wing section 20, 22 and the wheel carriage assembly 62 on the outboard side of the wheels 26, 28 so as to pivot the wheels away from each other in the transport position, as best seen in FIG. 5. This feature allows the wing sections 20, 22 to more closely approach each other. Thus, the wing sections, 20, 22 can be folded inwardly to be parallel with each other and the direction of travel. Wheels 26, 28 can also be raised and lowered, as well as pivoted about a vertical pivot axis.

Various latches are provided on the implement 10 for keeping it in a particular position. As shown in FIGS. 3, 6, 7, 8A and 8B, field position latch mechanisms 66, 68 selectively interconnect the tool bar 44 on the center frame 16 with the wing support member 46 or 48 so as to hold the implement 10 in a field position. In the field position, the wing sections 20, 22 are longitudinally aligned with the center frame 16. FIG. 6 shows the top of the area around the field position latch mechanism 68, and FIG. 7 shows the underside of the latch mechanism 68. The other field position latch mechanism 66 is not shown in detail because it is essentially identical to the field position latch mechanism 68. One portion of the latch mechanism 68 is stationary. A latch bar bracket 70 is rigidly attached to the tool bar 44 by welding or other conventional means. A latch bar 72 is mounted between a pair of spaced apart arms 74, 76 which extend forwardly underneath the tool bar 44.

The movable portion of the latch mechanism 68 has a pair of spaced apart jaws 78, 80 pivotally connected to a pair of spaced apart arms 82, 84. A crossbar 86 interconnects the arms 82, 84 below the jaws 78, 80 for additional structural rigidity. The arm 82 has the end opposite the jaw 78 connected to a latch operating hydraulic cylinder 88. The hydraulic cylinder 88 is swingingly held by a collar and yoke arrangement 90. The yoke portion of the collar and yoke arrangement 90 is attached to a mounting bar 92 which rests on the hitch bracket 94 and extends longitudinally adjacent the drafting link 32. The end of the arm 84 which is remote from the jaw 80 is pivotally connected to the rear end of a latch hook 96. The latch hook slidably mounts in a guide tube 98 secured to the mounting bar 92.

Referring to FIGS. 8A and 8B, the latch hook 96 has an end hooked upwardly and a longitudinally elongated slot 100 therebehind for receiving the latch bar 72. The underside of the latch hook 96 has a groove 102 therein which provides a cam action to drop the hooked end of the latch hook 96 as the intermediate portion of the latch hook 96 moves across the transversely mounted round bar 104 secured to the mounting bar 92.

As best shown in FIG. 8A, the hydraulic cylinder 88 holds the forward end of the slot 100 on the latch hook 96 tight against the latch bar 72 when the rod or actuating rod 89 is extended. Thus, the wing support member 48 is held against the tool bar 44 of the center frame 16. The support member 48 extends longitudinally parallel to the tool bar 44, which places the wing sections 20, 22 in the field operating position. In this position, the wing sections 20, 22 extend outwardly from the center frame 16 in a substantially straight line which is approximately perpendicular to the direction the implement travels.

When the rod 89 of the hydraulic cylinder 88 is retracted, as shown in FIG. 8B, the cylinder 88 pushes the latch hook 96 toward the latch bar 72. When the groove 102 on the latch hook 96 contacts the roller 104, the hook end of the latch hook 96 drops downwardly from the latch bar 72. In the position shown, the wing support member 48 and the drafting link 32 on the three-point hitch 34 are disconnected from the tool bar 44 of the center frame 16. Thus, the fold cylinder 56 can be extended to fold the implement 10 into the transport position.

Referring to FIGS. 9 and 10, the implement 10 of this invention is also provided with a transport position latch mechanism 106 on each of the wing sections 20, 22. The latch mechanism 106 preferably mounts to the pivotal mounting tube 108 of the marker wing 14, but anywhere on the outer portion of the wing section 20, 22 will suffice. The latching mechanism 106 includes a latching member 110 which has a hooked forward end adapted to extend partially around the hitch arm 50, 52 and a rear end pivotally mounted to the marker mounting tube 108. A pair of spaced apart arms 112 has one end connected to the latch member 110 and another end pivotally connected to a pair of spaced apart arms 114. The arms 114 are curved near their upper end and are pivotally attached to the marker mounting tube 108 at the approximate center of their curvature. The ends of the arms 114 which are remote from the arms 112 are pivotally connected to the rod 117 of a hydraulic cylinder 116 which has its other end pivotally connected to the marker mounting tube 108 as shown in FIG. 10. When the rod 117 of the hydraulic cylinder 116 is retracted, the latch member 110 is pulled upwardly and back as shown to unlatch the wing section 20 or 22. When the rod 117 of the hydraulic cylinder 116 is extended, the arms 112, 114 pivot so as to push the latch member 110 downwardly and outwardly to engage the hitch arm 52. Of course, another latch mechanism 106 secures the other wing section 20 to the hitch arm 50 in the same manner.

Another feature of the invention is that the lift assist wheels 18 are of the caster type and are pivotal, yet can be locked in a desired position, preferably parallel to the direction of travel. FIGS. 11 and 12 show the pivotal stop mechanism used to selectively limit the pivotal movement of the wheel 18. The wheel 18 is preferably a caster wheel assembly comprising a pair of wheels 118, 120 which are spaced apart on a horizontal axle 122. The axle 122 is mounted to the tool bar 44 by a substantially vertical wheel mounting arm 64. A block 124 having a substantially vertical slot 126 formed therein is rigidly attached to the axle 122.

An upper wheel mounting arm 128 extends over the lower wheel mounting arm 64, and these two components are pivotally connected in a conventional manner so that the wheel 18 can pivot about a vertical axis. A wedge 130 pivotally connects to the upper wheel mounting arm 128. The wedge 130 pivots in a vertical plane and can be snugly received by the slot 126. The rod 133 of a hydraulic cylinder 132 pivotally connects to the wedge 130 offset from its pivot axis. The other end of the hydraulic cylinder 132 is pivotally connected to the upper wheel mounting arm 128. When the wheel 18 has been pivoted into a position parallel to the desired direction of travel, the hydraulic cylinder 132 drives the wedge 130 into the slot 126. Thereafter, further pivotal motion of the wheel 18 is prevented. To unlock the wheel 18 and allow it to freely pivot again, the hydraulic cylinder rod 133 is retracted, and the wedge 130 is lifted from the slot 126, as shown in FIG. 12. The above-described locking mechanism may also be provided on the wing section wheels 26, 28.

In operation the implement 10 can be used for field operations, such as planting or the like, by arranging the wing sections 20, 22 at either end of the center frame 16, as shown in FIGS. 1 and 3. Once in the field position, the field position latch mechanisms 66, 68 are hydraulically engaged, preferably remotely from the cab of the tractor 38 using a central control and panel switches. The field position latch mechanisms 66, 68 hold the three-point hitch 34 on the tractor 38, as well as the wing support members 46, 48 to the tool bar 44 of the center frame 16. In the field mode or configuration, the wing sections 20, 22 extend longitudinally with respect to the center frame 16. Due to the unique tool carrying center frame 16 of this invention, a very wide working pass can be made through the field. The planter 10 covers a great number of adjacent rows.

The unique multi-axis pivoting connection of the wing sections 20, 22 allows the implement 10 to maintain its tools 24 in more constant contact with the ground. The wing sections 20, 22 can pivot or float to more closely conform to hills or other variations from levelness in the field. Furthermore, the hydraulically liftable wheels 18, 26 and 28 can be hydraulically controlled from the tractor 38 to give the operator greater control of the height, levelness and attitude of the center frame 16 and the wing sections 20, 22. In field operating position, the tool carrier is configured similar to a typical semi-integral implement: attached to the tractor with the draft links working in tandem with lift assist wheels at the rear of the carrier center frame. Unlike typical implements, this carrier uses castering lifting gage wheels on the front of the wings. These wing wheels are slaved to the center frame lift assist wheels to keep the bar height equalized. The field operation position allows greater maneuverability for turning at the end of rows and weight transfer to the tractor for unloading the implement in soft field conditions associated with integral implements. The frame folds forward to its transport position, keeping the center of gravity low and narrowing to a transport width of less than fifteen feet.

To convert to the road transport position, the operator fully raises the wheels 18, 26, 28. Next, the operator hydraulically disengages the field position latching mechanisms 66, 68, unlatching the wing sections 20, 22 from the center frame 16. The fold cylinders 54, 56 can then begin pulling or folding the wing sections 20, 22 forwardly and inwardly, as shown in FIG. 4. The center frame 16 and the tractor 38 may need to be moved farther apart to provide clearance for the folded sections 20, 22 and complete the folding process. Next, the wing section wheels 26, 28 are moved away from each other by actuating the hydraulic cylinders 116. Once the wing sections 20, 22 are essentially parallel to each other and to the direction of travel, the transport position latches 106 can be activated to secure the wing sections 20, 22 to the hitch arms 50, 52. At anytime after the wing sections 20, 22 reach their transport positions, the wing section wheels 26, 28 can be raised hydraulically off the ground so as not to interfere with the movement of the implement 10 in the transport mode.

Generally the transport mode is used when one desires to tow the implement 10 on a road where limited width is available. The implement 10 of the present invention provides an overall transport width of less than about 15 feet and a length of approximately 40 feet from the tractor draft links 32 to the lift assist wheels 18 on the center frame 16. This allows the implement 10 to be transported over most roads with minimal inconvenience. By contrast, the width of the implement 10 is approximately 40 to 60 feet in the field position. The implement or tool carrier 10 is configured similar to most other drawn implements, attaching to the tractor draft links rather than the drawbar. The hitch 34 allows turning 60° each direction and 40° total roll.

In either the field or the transport mode, the operator can lock the wheels 18 on the center frame 16 in the direction of travel. Keeping the wheels in a straight ahead position keeps the planter 10 directly behind the tractor 38 and overcomes the tendency of the implement 10 to drift sideways along hills.

To return to the field operation mode, the transport position latching mechanisms 106 are disengaged from the hitch arms 50, 52. The tractor 38 is slowly moved backwardly toward the center frame 16. The wing section wheels 26, 28 are pivoted to their original positions and lowered to the ground as the fold cylinders 54, 56 extend to pull the wing sections 20, 22 back into longitudinal alignment with the center frame 16. As the wing sections 20, 22 approach alignment with the center frame 16, the latch hook 96 of the field position latching mechanisms 66, 68 are extended and thereby dropped by the cam mechanism 102, 104 so as to be ready to receive the latch bar 72.

Once the wing sections 20, 22 are in position, the field position latching mechanisms 55, 58 are commanded to draw the latch hook 96 against the latch bar 72. This tightly secures the wing sections 20, 22 to the center frame 16 and attaches that assembly to the three-point hitch 34. Finally, the marker wings 12, 14 can be lowered for use if desired in the field operating position.

Although hydraulic actuating means have been shown in the preferred embodiments, electrical actuating means or hybrid hydroelectric means, can be utilized without detracting from the invention. Hydraulic or electric actuation is preferred because of their ability to be coordinated from a remote central control and control panel (preferably in the cab of the tractor).

Of course, the mounting of the stationary and moving components of the latch mechanisms can be reversed, if desired. For instance, the latch bar for the field position could be mounted on the hitch rather than on the center frame, and the transport latches could be mounted on the hitch bars.

In the drawings and specification, there has been set forth a preferred embodiment of the invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention as further defined in the following claims.

What is claimed is:

1. A forwardly foldable agricultural implement comprising:

a center frame rollingly supported by a plurality of wheels connected thereto, the center frame extending generally transversely to a direction of travel;

a pair of generally opposite wing sections each having opposite proximate and remote ends and an intermediate portion pivotally connected to the center frame by a foldable frame, the remote end of each wing section being rollingly supported by at least one wheel mounted on said wing section;

the foldable frame including a pair of elongated wing support members each having one end pivotally connected to the center frame and another end connected to the intermediate portion of a respective wing section;

the foldable frame further including a pair of hitch arms each having a remote end pivotally connected to the intermediate portion of one of the wing sections and a proximate end pivotally connected the approximate end of the other of the hitch arms at a two-direction pivot knuckle adapted to be connected to a three-point hitch on a tractor;

a field position latch mechanism for selectively holding the foldable frame in a substantially parallel relation to the center frame in a transversely folded position such that the implement is in a field position;

the field position latch mechanism including a latch bar rigidly mounted to one of the center frame and the hitch and a movable latch hook mounted to one of the hitch and the center frame for selectively engaging the latch bar.

2. The implement of claim 1 comprising a pair of fold cylinders operatively interconnecting the center frame and the wing support members respectively so as to fold and unfold the foldable frame.

3. The implement of claim 1 wherein the field position latch mechanism is hydraulically operated.

4. The implement of claim 1 wherein the latch bar is mounted on the center frame and the latch hook is movably mounted on the hitch.

5. The implement of claim 1 comprising a cam mechanism operatively engaging the latch hook to cause movement of the latch hook in a first plane when the latch hook is moved in a second plane.

6. The implement of claim 1 comprising a transport position latch mechanism for selectively holding the wing support members of the foldable frame substantially parallel to each other and to a direction of travel of the implement such that the implement is retained in a transport position.

7. The implement of claim 6 wherein the transport position latch mechanism is hydraulically operated.

8. The implement of claim 1 wherein a plurality of ground working tools are mounted on the center frame.

9. The implement of claim 1 wherein a plurality of ground working tools are mounted on both the center frame and on the wing sections.

10. The implement of claim 1 wherein hydraulic cylinders interconnect the center frame and the wheels on the center frame such that said wheels are height adjustable with respect to the center frame.

11. The implement of claim 1 wherein a hydraulic cylinder interconnects the respective wing sections and the corresponding wheels thereon such that the wheels on the wing sections are each height adjustable with respect to the respective wing sections.

12. The implement of claim 1 wherein at least one hydraulic lift cylinder is operatively connected to the wheels on each of the center frame and the wing sections, a control being connected to the cylinders so as to raise and lower the implement in a coordinated manner.

13. The implement of claim 1 wherein the plurality of wheels connected to the center frame includes a lift assist wheel that is pivotal with respect to the center frame in a horizontal plane and wherein a stop mechanism is interposed between the center frame and the lift assist wheel so as to selectively limit pivotal movement of the lift assist wheel with respect of the center frame in a horizontal plane.

14. The implement of claim 1 wherein said at least one wheel mounted on said wing section comprises a horizontally pivotable and hydraulically raisable wheel carriage assembly.

15. A forwardly foldable agricultural implement comprising:
- a center frame rollingly supported by a plurality of wheels connected thereto, the center frame extending generally transversely to a direction of travel;
- a pair of generally opposite wing sections each having opposite proximate and remote ends and an intermediate portion pivotally connected to the center frame by a foldable frame, the remote end of each wing section being rollingly supported by at least one wheel mounted on said wing section;
- the foldable frame including a pair of elongated wing support members each having one end pivotally connected to the center frame and another end connected to the intermediate portion of a respective wing section;
- the foldable frame further including a pair of hitch arms each having a remote end pivotally connected to the intermediate portion of one of the wing sections and a proximate end pivotally connected the approximate end of the other of the hitch arms at a two-direction pivot knuckle adapted to be connected to a three-point hitch on a tractor;
- a wheel carriage assembly supporting the at least one wheel on each of the wing sections, the wheel carriage assembly including a wheel mounting arm having one end mounted on the wing section and a free end rotatively supporting at least one wheel, at least one of the ends of the wheel mounting arm being selectively movable longitudinally along the wing section.

16. The implement of claim 15 wherein the mounting arm is pivotally mounted to the wing section and a hydraulic cylinder is connected to the wing section and the wheel carriage assembly so as to selectively swing the wheel carriage assembly from a travel position extending generally perpendicular to the wing section to a storage position skewed from perpendicular to the wing section.

17. The implement of claim 16 wherein the cylinder is mounted on the wing section outboard of the wheel carriage assembly.

18. The implement of claim 15 wherein a pair of wheels is rotatably and pivotally supported by the wheel carriage assembly so as to define a caster assembly.

19. A method of changing a foldable tractor-drawn implement between a field operating configuration and road transport configuration, the steps comprising:
- providing the foldable implement with a center frame and left and right wing sections pivotally connected to the center frame by a foldable frame, the center frame and the wing sections all being supported by ground engaging raisable wheels thereon, the foldable frame having a pair of wing support members pivotally connected at one end to the center frame and at another end to a pair of respective hitch arms which are pivotally mountable on a three-point hitch on a tractor;
- raising the implement by raising the wheels;
- unlatching the wing sections from the center frame;
- folding the wing sections forwardly and inwardly by pivoting the wing support members forwardly with respect to the center frame;
- moving the tractor forward and away from the center frame to pull the hitch arms together and further fold the wing sections connected thereto into a substantially parallel relationship with each other and a direction of travel;
- whereby in said substantially parallel relationship the right and left wing sections and the supporting wheels thereon are registered directly across from each other;
- moving said supporting wheels on said wing sections horizontally out of registration with each other so that the wing sections can more closely approach each other;
- latching the wing sections to the foldable frame so as to retain the implement in the transport configuration;
- and raising the wheels on the wing sections from engagement with the ground.

20. The method of claim 19 wherein a wing marker is pivotally attached to a remote end of each wing section and the method includes the step of pivotally raising the wing marker before the wing sections are latched to the foldable frame.

21. The method of claim 19 comprising:
- lowering the wheels on the wing sections onto the ground;
- moving the wheels on the wing sections into direct alignment in a vertical plane with each other and unlatching the wing sections from the folding frame;
- moving the tractor rearward toward the center frame to spread the hitch arms apart and pivot the wing sections outwardly and rearwardly;
- folding the wing sections further outwardly and rearwardly by pivoting the wing support members with respect to the center frame until the wing sections are aligned with the center frame and extend approximately perpendicular to the direction of travel; and
- latching the wing sections, the three-point hitch, and the folding frame to the center frame so as to place the implement in the field configuration.

22. A forwardly foldable agricultural implement comprising:
- a center frame rollingly supported by a plurality of wheels connected thereto, the center frame extending generally transversely to a direction of travel;

a pair of generally opposite wing sections each having opposite proximate and remote ends and an intermediate portion pivotally connected to the center frame by a foldable frame, the remote end of each wing section being rollingly supported by at least one wheel mounted on said wing section;

the foldable frame including a pair of elongated wing support members each having one end pivotally connected to the center frame and another end connected to the intermediate portion of a respective wing section;

the foldable frame further including a pair of hitch arms each having a remote end pivotally connected to the intermediate portion of one of the wing sections and a proximate end pivotally connected the approximate end of the other of the hitch arms at a two-direction pivot knuckle adapted to be connected to a three-point hitch on a tractor;

the plurality of wheels connected to the center frame comprising a lift assist wheel that is pivotal with respect to the center frame in a horizontal plane and wherein a stop mechanism is interposed between the center frame and the lift assist wheel so as to selectively limit pivotal movement of said lift assist wheel with respect to the center frame in the horizontal plane;

the stop mechanism including a downwardly directed wedge pivotally mounted on the center frame adjacent said lift assist wheel and an upwardly directed slot on said lift assist wheel for receiving and abutting the wedge so as to stop pivotal movement of said lift assist wheel about a substantially vertical axis.

23. The implement of claim 22 comprising a horizontally disposed pivot pin extending into the wedge so as to define a pivot axis and a hydraulic cylinder having an actuator rod connected to the wedge at a point offset from the pivot axis so as to rotate the wedge about the pivot pin.

24. A forwardly foldable agricultural implement comprising:

a center frame rollingly supported by a plurality of wheels connected thereto, the center frame extending generally transversely to a direction of travel;

a pair of generally opposite wing sections each having opposite approximate and remote ends and an intermediate portion pivotally connected to the center frame by a foldable frame, the remote end of each wing section being rollingly supported by at least one wheel mounted on said wing section;

the foldable frame including a pair of elongated wing support members each having one end pivotally connected to the center frame and another end connected to the intermediate portion of a respective wing section;

the foldable frame further including a pair of hitch arms each having a remote end pivotally connected to the intermediate portion of one of the wing sections and a proximate end pivotally connected the proximate end of the other of the hitch arms at two-direction pivot knuckle adapted to be connected to a three-point hitch on a tractor;

a transport position latch mechanism for selectively holding the wing support members of the foldable frame substantially parallel to each other and to a direction of travel of the implement such that the implement is retained in a transport position;

the transport position latch mechanism comprising a latch hook pivotally mounted on the remote end of the wing section for selectively engaging the hitch arm.

25. A forwardly foldable agricultural implement comprising:

a pivot knuckle adapted to be rigidly mounted to a three-point hitch on a tractor;

a center frame extending generally transverse to a direction of travel;

generally opposing first and second wing sections pivotally connected to the center frame;

a foldable frame comprising first and second elongated hitch arms, the first hitch arm having a first end pivotally connected to the pivot knuckle and a second end pivotally connected to the first wing section, the second hitch arm having a first end pivotally connected with the pivot knuckle and a second end pivotally connected to the second wing section;

the foldable frame having a folded position wherein the first and second hitch arms are pivoted horizontally inward toward each other about the pivot knuckle and the foldable frame is pivotable in a horizontal plane with respect to the pivot knuckle, whereby the first and second wings are pivotally drawn inwardly toward each other and the implement operates as a pivotally drawn implement adapted for road transport;

the foldable frame having an unfolded position wherein the first and second hitch arms are aligned substantially end-to-end at the pivot knuckle so as to extend generally parallel to the center frame, whereby the first and second wing sections are pivoted away from each other;

a field position latch mechanism for selectively securing the foldable frame in the unfolded position and preventing pivoting of the foldable frame in a horizontal plane about the pivot knuckle, whereby when the foldable frame is secured in the unfolded position the implement operates as a mounted implement adapted for field operation by being rigidly mounted to the three-point hitch.

* * * * *